(No Model.)

R. MUNROE.
MAN HOLE COVER.

No. 339,998. Patented Apr. 13, 1886.

WITNESSES:
Darwin S. Wolcott
C. M. Clarke

INVENTOR,
Robert Munroe.
BY George H. Christy
ATTORNEY.

UNITED STATES PATENT OFFICE.

ROBERT MUNROE, OF ALLEGHENY, PENNSYLVANIA.

MAN-HOLE COVER.

SPECIFICATION forming part of Letters Patent No. 339,998, dated April 13, 1886.

Application filed September 14, 1885. Serial No. 176,999. (No model.)

*To all whom it may concern:*

Be it known that I, ROBERT MUNROE, residing at Allegheny, in the county of Allegheny and State of Pennsylvania, a citizen of the United States, have invented or discovered certain new and useful Improvements in Seats for Man-Hole Covers, of which improvements the following is a specification.

Figure 1:
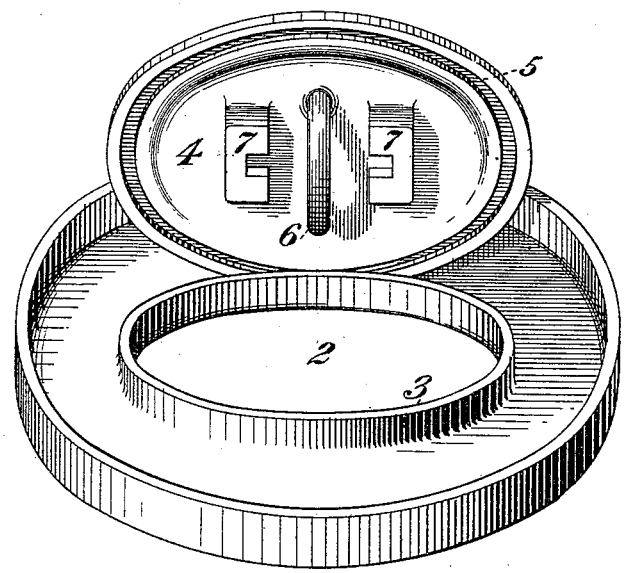
Figure 2:
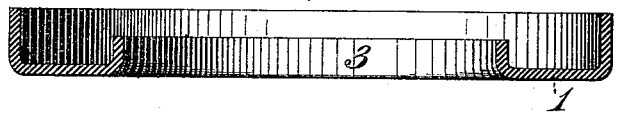

In the accompanying drawings, which make part of this specification, Figure 1 is a perspective view of a boiler-head embodying my invention, the man-hole plate being also shown. Fig. 2 is a sectional view of the boiler-head, the section being taken on the line $x$ $x$, Fig. 1.

The invention herein relates to certain improvements in the manufacture of boiler-heads, plates for tanks, and other articles in which man-holes and other like openings are formed; and the invention has for its object the strengthening of such heads or plates around the edges of the openings formed therein, and also providing for a more perfect fitting or seating of the plates or covers used for closing or sealing such openings. It has been heretofore customary to form such openings by cutting out a portion of the head or plate, and then riveting or otherwise securing a heavy metal ring or gasket around the periphery of the opening so cut. This method is, however, quite expensive, on account of the time and labor required in riveting the strengthening-gasket in place. In lieu of this tedious and expensive operation I propose to form the man-hole or opening in a manner similar to that now employed in forming flue-openings in boiler-heads—*i. e.*, by cutting out a portion of the head, the opening so formed being smaller than required, and then increasing the size of the opening to the desired dimensions by flanging up the edges of the plate surrounding the cut opening.

In the drawings I have shown my improvement as applied to the head 1 of a boiler or mud-drum having a man-hole, 2, formed therein in the manner above stated, said opening being surrounded by a flange, 3, which renders the head much more rigid than is possible where the re-enforcing ring or gasket is employed. The edges of this upturned flange 3 are chiseled or otherwise trimmed off to a smooth uniform surface.

The man-hole plate or cover 4 is provided near its outer edge with a circumferential groove, 5, of a depth somewhat less than the height of the flange 3, which projects into the groove when the plate or cover 4 is put in place, a gasket of rubber or other suitable packing being first placed in the groove 5. The outer face of the plate or cover 4 is provided with a handle, 6, and lugs 7, for the reception of the the heads of the securing-bolts, the plate or cover being drawn and held in place in the usual manner.

The invention herein is applicable to all variety of structures—as, for example, tanks, boilers, mud-drums, steam-drums, &c.—in which man-hole openings are necessary or useful.

The man-hole may be of any desired shape or contour.

I am aware that it is old to form flanges around the flue-holes in tube-sheets for boilers, said flanges being intended for the support and retention of the tubes for flues, and I do not therefore claim such a construction, broadly.

I claim herein as my invention—

A metal plate or head for boilers, &c., having a man-hole therein, said hole or opening being surrounded by a flange integral with the head, as described, in combination with a cover having a circumferential groove therein for the reception of the flange, substantially as set forth.

In testimony whereof I have hereunto set my hand.

ROBERT MUNROE.

Witnesses:
DARWIN S. WOLCOTT,
R. H. WHITTLESEY.